US012735120B2

(12) United States Patent
Bradley

(10) Patent No.: US 12,735,120 B2
(45) **Date of Patent: *Sep. 15, 2026**

(54) AERODYNAMIC TRAILER APPARATUS WITH OPTIMIZED SMALL SKIRT

(71) Applicant: Trailer Aerodynamics LLC, Chicago, IL (US)

(72) Inventor: Calvin Rhett Bradley, Blountville, TN (US)

(73) Assignee: Trailer Aerodynamics LLC, Chicago, IL (US)

( * ) Notice: Subject to any disclaimer, the term of this patent is extended or adjusted under 35 U.S.C. 154(b) by 396 days.

This patent is subject to a terminal disclaimer.

(21) Appl. No.: 18/263,382

(22) PCT Filed: Feb. 1, 2021

(86) PCT No.: PCT/US2021/016027
§ 371 (c)(1),
(2) Date: Jul. 28, 2023

(87) PCT Pub. No.: WO2022/164455
PCT Pub. Date: Aug. 4, 2022

(65) Prior Publication Data

US 2024/0083519 A1 Mar. 14, 2024

(51) Int. Cl.
*B62D 35/00* (2006.01)
*B62D 25/18* (2006.01)

(52) U.S. Cl.
CPC ......... *B62D 35/001* (2013.01); *B62D 25/188* (2013.01)

(58) Field of Classification Search
CPC ............................ B62D 35/001; B62D 25/188
(Continued)

(56) References Cited

U.S. PATENT DOCUMENTS 2,782,053 A * 2/1957 Long .................... B62D 25/188 160/231.1
4,486,046 A * 12/1984 Whitney ............. B62D 35/001 296/180.4
(Continued)

FOREIGN PATENT DOCUMENTS

CN 211194773 U 8/2020
GB 2610170 * 1/2023 ............. B62D 35/00
WO WO2019068089 * 4/2019 ........... B62D 25/188

OTHER PUBLICATIONS

Guariento, Dario; "System for optimizing the aerodynamics of the underside of a semi-trailer of an articulated industrial or commercial vehicle"; EP 1870322 B1 (Year: 2010).*
(Continued)

*Primary Examiner* — Jonathan Malikasim
(74) *Attorney, Agent, or Firm* — Hansen Reynolds LLC

(57) ABSTRACT

An apparatus (10) for a trailer (12) is provided that has a trailer skirt (14) configured for attachment to the trailer (12). A majority of the outer surface length of an outer surface (16) of the trailer skirt (14) is oriented at a 3-7 degree angle to the longitudinal direction, and the majority of the outer surface length extends inboard in the lateral direction upon extension forward of the trailer skirt (14) in the longitudinal direction. An overall length/overall height ratio of the trailer skirt (14) is 6 or less. The trailer length in the longitudinal direction is at least 10.668 meters (35 feet). A majority of the outer surface length is located rearward of a longitudinal midpoint of the trailer. A rib cover (74) is present and is located higher than a bottom edge of the trailer skirt (14) in the height direction.

18 Claims, 8 Drawing Sheets

(58) Field of Classification Search
USPC ........................................................ 296/180.4
See application file for complete search history.

(56) References Cited

U.S. PATENT DOCUMENTS

| | | | | |
|---|---|---|---|---|
| 6,851,717 | B1 | 2/2005 | Andersen | |
| 6,974,178 | B2 * | 12/2005 | Ortega .................. | B62D 35/02<br>296/180.1 |
| 9,221,390 | B1 | 12/2015 | Begley | |
| 9,308,949 | B1 * | 4/2016 | Mihelic ................ | B62D 35/001 |
| 11,091,207 | B1 | 8/2021 | Ming et al. | |
| 11,332,203 | B2 * | 5/2022 | Senatro .................. | B62D 35/02 |
| 2013/0320658 | A1 | 12/2013 | Eklund et al. | |
| 2014/0054924 | A1 | 2/2014 | Pfaff | |
| 2014/0265438 | A1 | 9/2014 | Kronemeyer | |
| 2020/0231226 | A1 | 7/2020 | Senatro et al. | |
| 2020/0406988 | A1 | 12/2020 | Bradley | |
| 2021/0188373 | A1 * | 6/2021 | Chung ................. | B62D 35/001 |
| 2024/0083520 | A1 * | 3/2024 | Bradley ............... | B62D 35/001 |

OTHER PUBLICATIONS

European Patent Office, International Search Report and Written Opinion dated May 11, 2021, pp. 1-16 (included), European Patent Office, Rijswijk, The Netherlands.
International Search Report and Written Opinion, Nov. 17, 2024, International Application No. PCT/US2025/043377, Australia.
Canadian Intellectual Property Office, Examination Search Report, Feb. 12, 2026, Application No. 3,206,585, Canada.

* cited by examiner 36
34
70
30
82
84
18
14
72
76
66
68
78
10
80
12
38
94
98

36
12
70
30
82
84
10
16
14
66
72
17,18
74
20
80
38
94
32

AERODYNAMIC TRAILER APPARATUS WITH OPTIMIZED SMALL SKIRT

CROSS-REFERENCE TO RELATED APPLICATIONS

The present application is a 35 U.S.C. § 371 application of PCT/US2021/016027 filed on Feb. 1, 2021 and entitled "Aerodynamic Trailer Apparatus with Optimized Small Skirt" and claims benefit thereto. The entire contents of PCT/US2021/016027 are incorporated by reference herein in their entirety for all purposes.

FIELD OF THE INVENTION

The subject matter of the present invention relates to an apparatus that improves aerodynamic performance of the trailer of a tractor trailer. More particularly, the present application involves a small skirt for a full sized trailer that is angled and positioned more rearward on the trailer to optimize the amount of skirt material per unit of fuel savings.

BACKGROUND OF THE INVENTION

Trailers towed by trucks and similar apparatuses for transporting cargo can be large, unwieldy, and include geometries which invite inefficiencies during travel. One aspect of these inefficiencies concerns the aerodynamics of the trailer. For maximum capacity, the trailer is box shaped which is not the most aerodynamically available option. In an effort to improve trailer aerodynamics, trailers have been built, supplemented, or retro-fitted with trailer skirts (or side skirts) that are devices affixed to the underside of the trailer which limit air circulating in the empty space between the trailer's axles. By reducing the amount of airflow in this space, drag caused by turbulence is reduced and permits the trailer to be towed more efficiently, increasing the gas mileage and performance of the vehicle and its cargo. Large skirts are known to save more fuel than smaller skirts. However, a larger trailer skirt is both more expensive, more likely to be damaged, more difficult to install, and increases logistics cost. Large skirts can fit on full sized, 53 foot, trailers but cannot fit on smaller sized trailers thus complicating fleet logistics in that different sized skirts have to be installed on different sizes trailers. Also, larger trailer skirts increase the weight of the trailer and limit access under the trailer where items such as refrigerator fuel tanks, spare tires, tire chains, or toolboxes are located.

As large skirts extend the majority of the length present between the trailer tires and the drive tires, the breakover angle of the tractor and trailer combination may cause the large skirt to impact the roadway or other object when travelling upwards over a hill. Larger skirts have more area and thus increased chances of being damaged by side impacts with obstacles. In order to eliminate the negative consequences of having a large trailer skirt under the trailer, systems have been designed to remove the presence of the large trailer skirt yet still maintain some of the aerodynamic performance the large trailer skirt affords. Such aerodynamic systems employ aerodynamic ramps, wedges, or products located at the rear end of the trailer. These aerodynamic components may be located on the sides of the trailer or extend from the back, terminal end of the trailer. Although these systems may increase access under the trailer and eliminate damage that would otherwise occur to the trailer skirt, such systems cannot achieve the fuel savings a large trailer skirt offers. As such, there is room for variation and improvement within the art.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

The use of identical or similar reference numerals in different figures denotes identical or similar features.

DETAILED DESCRIPTION OF THE INVENTION

Figures 1, 2:
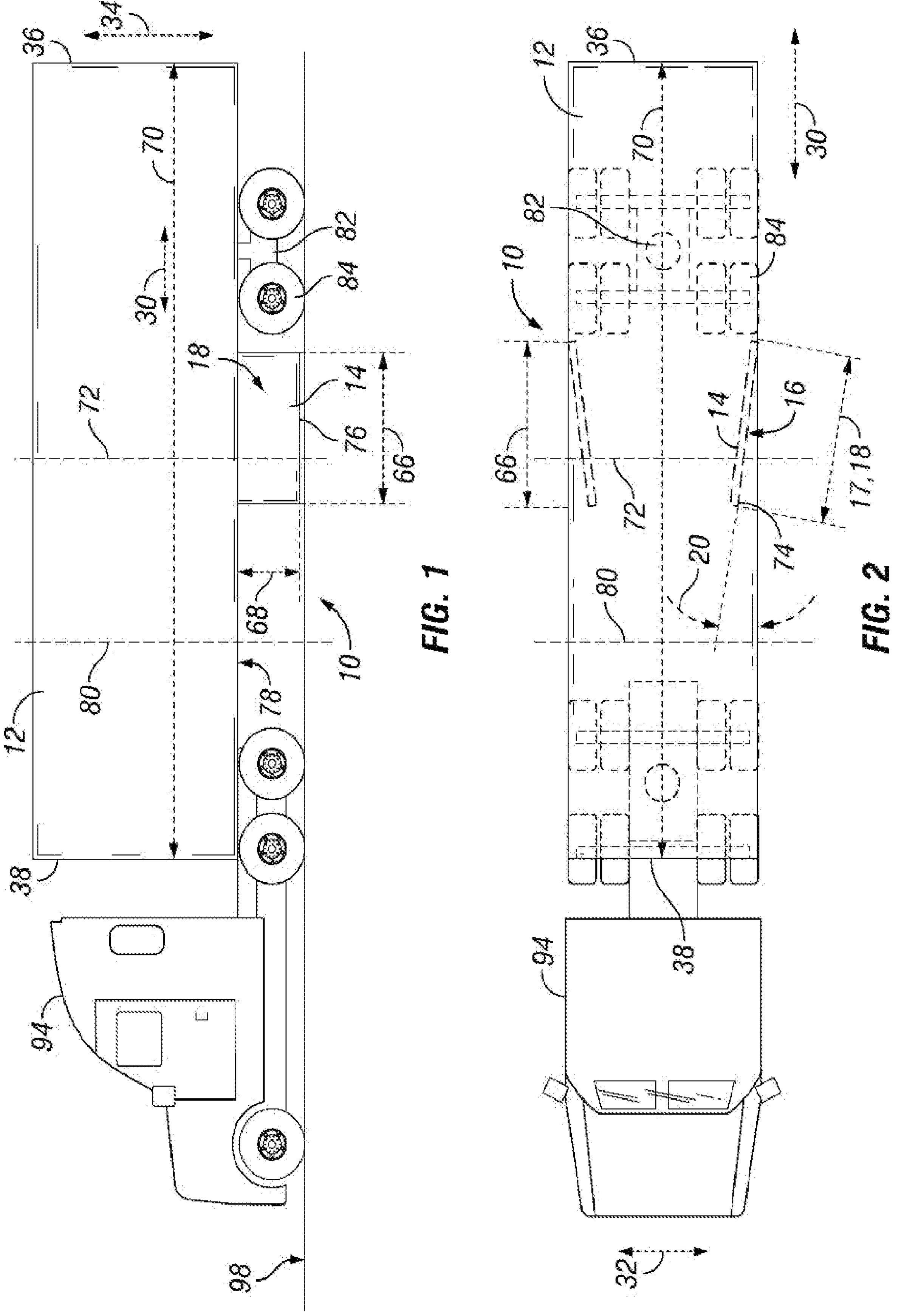
FIG. 1 is a side view of a tractor hauling a trailer that includes an apparatus with an optimized trailer skirt in accordance with one exemplary embodiment.
FIG. 2 is a top view of FIG. 1.

Reference will now be made in detail to embodiments of the invention, one or more examples of which are illustrated in the drawings. Each example is provided by way of explanation of the invention, and not meant as a limitation of the invention. For example, features illustrated or described as part of one embodiment can be used with another embodiment to yield still a third embodiment. It is intended that the present invention include these and other modifications and variations.

The present invention provides for an apparatus 10 that achieves aerodynamic performance of a trailer 12 when hauled by a tractor 94. The apparatus 10 includes an optimized small trailer skirt 14, and a rib cover 74 that covers cross-members 96 of the trailer 12. The trailer skirt 14 has an outer surface 16 a majority of which is oriented relative to the longitudinal direction 30 so as to be oriented at an angle 20 to the longitudinal direction 30 that is from 3 degrees to 7 degrees. The trailer skirt 14 extends inboard in the lateral direction 32 upon forward extension in the longitudinal direction 30. The overall length 66 of the trailer skirt 14 has a ratio to the overall height 68 of the trailer skirt that is six or less. Further, the trailer skirt 14 is positioned generally towards the rear of the trailer 12 in the longitudinal direction 30. In this regard, the trailer 12 has a longitudinal midpoint 72 and a majority of the outer surface 16 of the trailer skirt 14 is positioned rearward of this longitudinal midpoint 72 in the longitudinal direction 30. The trailer 12 to which the apparatus 10 is configured for use is not a short trailer 12 but is instead at least 35 feet in length 70. The optimization of the skirt 14 as defined within the described parameters provides a fast return on investment that minimizes material used per unit of fuel savings. The trailer skirt 14 as configured allows for access under the trailer 12, improves breakover angle, and is less prone to being damaged.

Figure 3:
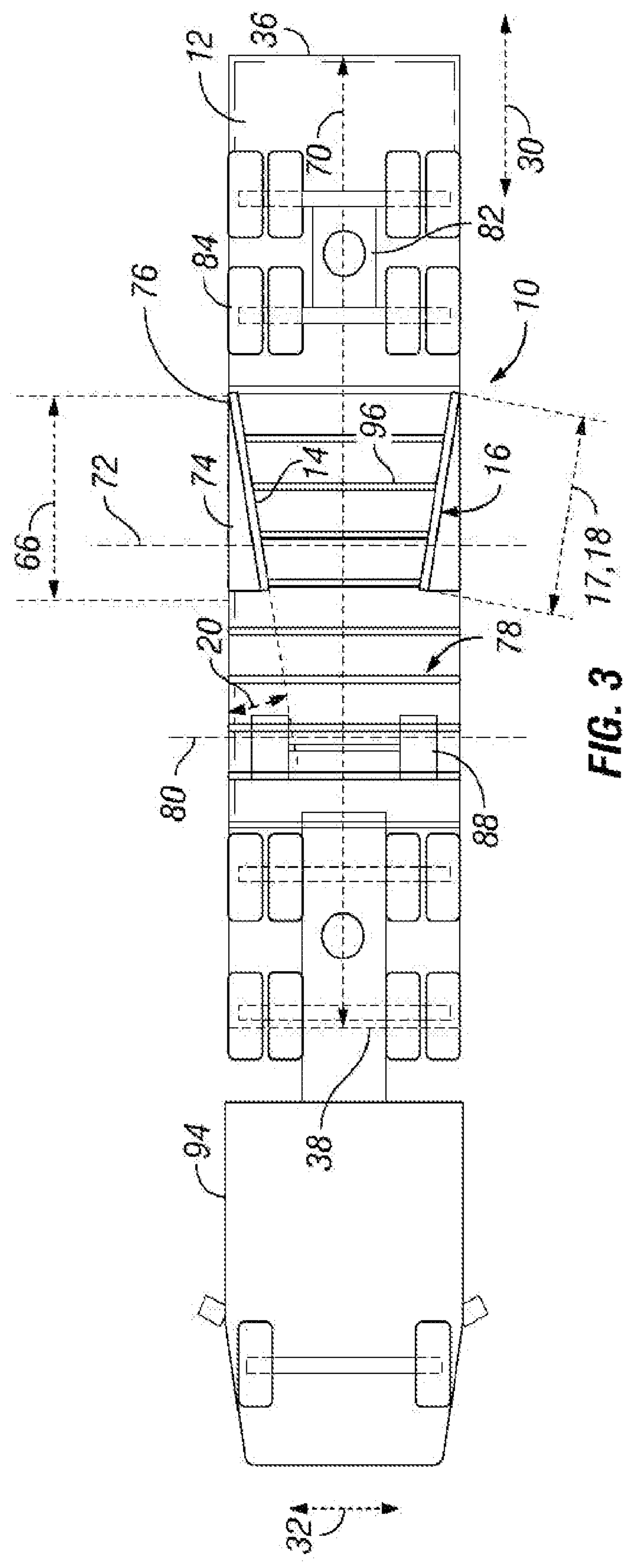
FIG. 3 is a bottom view of FIG. 1.

FIGS. 1-3 show a tractor 94 with attached trailer 12 on the ground 98. In normal use, the tractor 94 is driven forward in the longitudinal direction 30 and aerodynamic features of the system are designed to handle this forward motion. Trailer skirts 14 are part of the apparatus 10 and can be located on the left and right hand sides of the trailer 12 in the lateral direction 32 extending downward from a lower surface 78 of the trailer 12 in the height direction 34. The trailer skirts 14 are panels that have surfaces that can be variously shaped that direct airflow accordingly. Trailer skirts 14 can be made of aluminum, plastic, fiberglass, or other materials and may be a single piece or can be composed of multiple panels that are attached to or otherwise situated relative to one another. The outer surface 16 of the trailer skirt 14 faces outboard in the lateral direction 32 and air impacts this outer surface 16 upon forward motion of the tractor trailer such that the aerodynamic properties of the trailer 12 are improved as opposed to the case when the trailer skirt 14 is not present and additional air forces strike the bogie assembly 82 or other portions of the trailer 12.

The trailer skirt 14 is positioned generally rearward on the trailer 12. In this regard, the trailer 12 has rearward terminal end 36 and a forward terminal end 38 in the longitudinal direction 30. A trailer length 70 extends from the rearward terminal end 36 to the forward terminal end 38 in the longitudinal direction 30. The longitudinal midpoint 72 of the trailer 12 is located halfway between the terminal ends 36, 38 in the longitudinal direction 30. The trailer skirt 14 has an outer surface length 17 that extends farther in the longitudinal direction 30 than in the lateral direction 32 or the height direction 34. The outer surface length 17 can be measured by extending a measuring device from the rearward to forward ends of the trailer skirt 14. The outer surface length 17 is shown as extending between these points and being angled an angle 20 to the longitudinal direction 30. Additionally or alternatively, since the angle 20 is so small it will be the case that the overall longitudinal length 66 of the trailer skirt 14 will be about the same as the outer surface length 17, and the outer surface length 17 could be assigned or calculated by using simply the overall length in the longitudinal direction 66. Upon obtaining the outer surface length 17, the trailer skirt 14 may be positioned on the trailer 12 so that a majority of the outer surface length 17 is located rearward of the longitudinal midpoint 72 in the longitudinal direction 30. In this regard, a greater portion of the length of the outer surface 16 is rearward of the longitudinal midpoint 72 in the longitudinal direction 30, and a smaller portion of the outer surface length 17 measured in the longitudinal direction 30 is forward of the longitudinal midpoint 72. The area of the outer surface 16 need not be calculated when making this measurement.

The trailer 12 has a bogie assembly 82 that carries a plurality of tires 84. The bogie assembly 82 may be adjustable in the longitudinal direction 30 to account for different loading arrangements of the trailer 12. The trailer skirt 14 can be arranged relative to the bogie assembly 82 so that the entire trailer skirt 14 is located forward of the bogie assembly 82 in the longitudinal direction 30. As such, the entire trailer skirt 14 can be located forward of all of the tires 84 of the bogie assembly 82 in the longitudinal direction 30. The trailer skirt 14 may be forward of the bogie assembly 82 and the tires 84 even upon moving an adjustable bogie assembly completely forward in the longitudinal direction 30. In other embodiments, the trailer skirt 14 may in fact extend rearward of portions of the bogie assembly 82 or tires 84 in the longitudinal direction 30. FIGS. 1-3 also illustrate a 30% point 80 that is a location of the trailer 12 that is positioned 30% of the length from the forward terminal end 38 in the longitudinal direction 30. The 30% point is 30% of the trailer length 70, and this distance is measured rearward from the forward terminal end 38 in the longitudinal direction 30. The trailer skirt 14 may be arranged relative to the trailer 12 so that the entire trailer skirt 14 is located rearward of the 30% point 80 in the longitudinal direction 30. In this regard, no portion of the trailer skirt 14 is located at the 30% point 80 or forward of the 30% point 80 relative to the longitudinal direction 30. In yet other arrangements of the apparatus 10, some amount of the trailer skirt 14 can be at or forward of the 30% point 80.

The trailer 12 may include landing gear 88 that can be extended onto the ground 98 to support the trailer 12 when the tractor 94 is not attached to and supporting the front end of the trailer 12. When the tractor 94 is attached to and supports the trailer 12, the landing gear 88 may be retracted up off of the ground 98. The trailer skirt 14 can be positioned on the trailer 12 so that the entire trailer skirt 14 is located rearward of the landing gear 88 in the longitudinal direction 30. In yet other arrangements of the apparatus 10, some portion of the trailer skirt 14 may extend to and be forward of the landing gear 88 in the longitudinal direction 30.

In order to achieve improved aerodynamic performance, the trailer skirt 14 is oriented at an angle to the longitudinal direction 30. In this regard, the trailer skirt 14 extends inboard in the lateral direction 32 upon extension of the trailer skirt 14 forward from rear to front in the longitudinal direction 30. The outer surface 16 has an outer surface majority length 18 which is a portion of the outer surface length 17 that extends over a majority of the length of the outer surface length 17. Because the trailer skirt 14 outer surface 16 is flat, the outer surface majority length 18 can be identical to the outer surface length 17. However, if the outer surface length 17 is primarily flat but has a curved front end, the outer surface majority length 18 can be the flat portion of the outer surface 16 and the curved portion of the outer surface 16 is not part of the outer surface majority length 18. The angle 20 is the angle of the outer surface majority length 18 to a line extending only completely in the longitudinal direction 30.

The angle 20 may be 3, 4, 5, 6, or 7 degrees in certain exemplary embodiments. In some embodiments, the angle 20 is from 3 to 7 degrees, from 5 to 6 degrees, or 5.5 degrees in various exemplary embodiments. The optimized, most favorable angle 20 is 5.5 degrees, although others in the 3-7 degree range will work as well. When calling for a range of angles, it is to be understood that the range includes the numbers of the limits in addition to all numbers within the two outer limits. The provision of two trailer skirts 14 oriented at the aforementioned angle 20 provide at subsonic flow a velocity decrease in a divergent nozzle. This causes the flow of air between the trailer skirts 14 to slow down due to the angles 20 before reaching the bogie assembly 82 and tires 84. This slow down of air reduces pressure on the tires 84 and bogie assembly 82 structure and compliments the wake structure which enhances the effectiveness of a present top fairing 26. The angle 20 is present so that the leading edge of the trailer skirt 14 is positioned inboard in the lateral direction 32 far enough to prevent air flow from entering under the trailer 12. This insetting of the leading edge of the trailer skirt 14 can be accomplished by using a long trailer skirt with a small angle as is known, or by using a short trailer skirt 14 with a large angle 20 which is not known. The larger angle 20 allows for the same level of inset of the leading edge of the trailer skirt 14 as would a longer skirt accomplish.

The trailer 12 may be constructed so that a plurality of cross-members 96, sometimes referred to as ribs, are at the lower surface 78 of the trailer 12. The cross-members 96 extend in the lateral direction 32 of the trailer 12 and each one of the cross-members 96 is spaced from successive cross-members 96 in the longitudinal direction 30. Wind may engage the cross-members 96 during travel of the trailer 12 and cause aerodynamic drag or otherwise detract from the aerodynamic properties of the trailer 12. The apparatus 10 includes a rib cover 74 that covers a portion of at least one or more of the cross-members 96 in order to minimize or prevent drag on these portions of the cross-members 96. The rib cover 74 may engage the cross-members 96 or could be spaced therefrom so long as the rib cover 74 minimizes drag associated from wind hitting the cross-members 96. The rib cover 74 may engage the trailer skirt 14 or could be spaced therefrom. The rib cover 74 is positioned so as to be outboard of the trailer skirt 14 in the lateral direction 32. In this regard, the rib cover 74 is outboard in the lateral direction 32 from the outer surface 16 and the outer surface 16 may directly face the rib cover 74. The rib cover 74 may be wedge shaped and can extend along the entire outer surface length 17 such that the rib cover 74 extends the same amount in the longitudinal direction 30 as does the trailer skirt 14. The rib cover 74 may be integrally formed with the trailer skirt 14 or could be a separate component that is attached thereto or spaced therefrom. The rib cover 74 may be positioned so that the majority of the longitudinal length of the rib cover 74 is rearward of the longitudinal midpoint 72. Further, the rib cover 74 can be set up so that all of the rib cover 74 is rearward of the 80% point 80 in the longitudinal direction 30. Additionally, or alternatively, the entire rib cover 74 can be oriented so that the entire rib cover 74 is completely forward of the bogie assembly 82 in the longitudinal direction 30. Still further, the entire rib cover 74 may be completely rearward of the landing gear 88 in the longitudinal direction 30. The rib cover 74 can be limited to being outboard of the trailer skirts 14 in the lateral direction 32, but there are no rib covers 74 covering any of the cross-members 96 at locations inboard from the two trailer skirts 14 in the lateral direction 32. As such, embodiments exist in which the rib covers 74 are present and are all located only outboard of their respective trailer skirts 14 in the lateral direction 32.

Although described and labeled in the figures as a single trailer skirt 14 and a single rib cover 74, it is to be understood that a second trailer skirt 14 and a second rib cover 74 can be located on the opposite side of the trailer 12 in the lateral direction 32 as shown in FIGS. 1-3. The second trailer skirt 14 and rib cover 74 can be arranged in the same manners as previously discussed with respect to the first trailer skirt 14 and rib cover 74, and a repeat of this information is not necessary. The provision of a rib cover 74 allows the trailer skirt 14 to be oriented with the angle 20 without increasing drag caused by air flow hitting the cross-members 96 that would otherwise occur if the rib cover 74 were not present.

Figure 4:
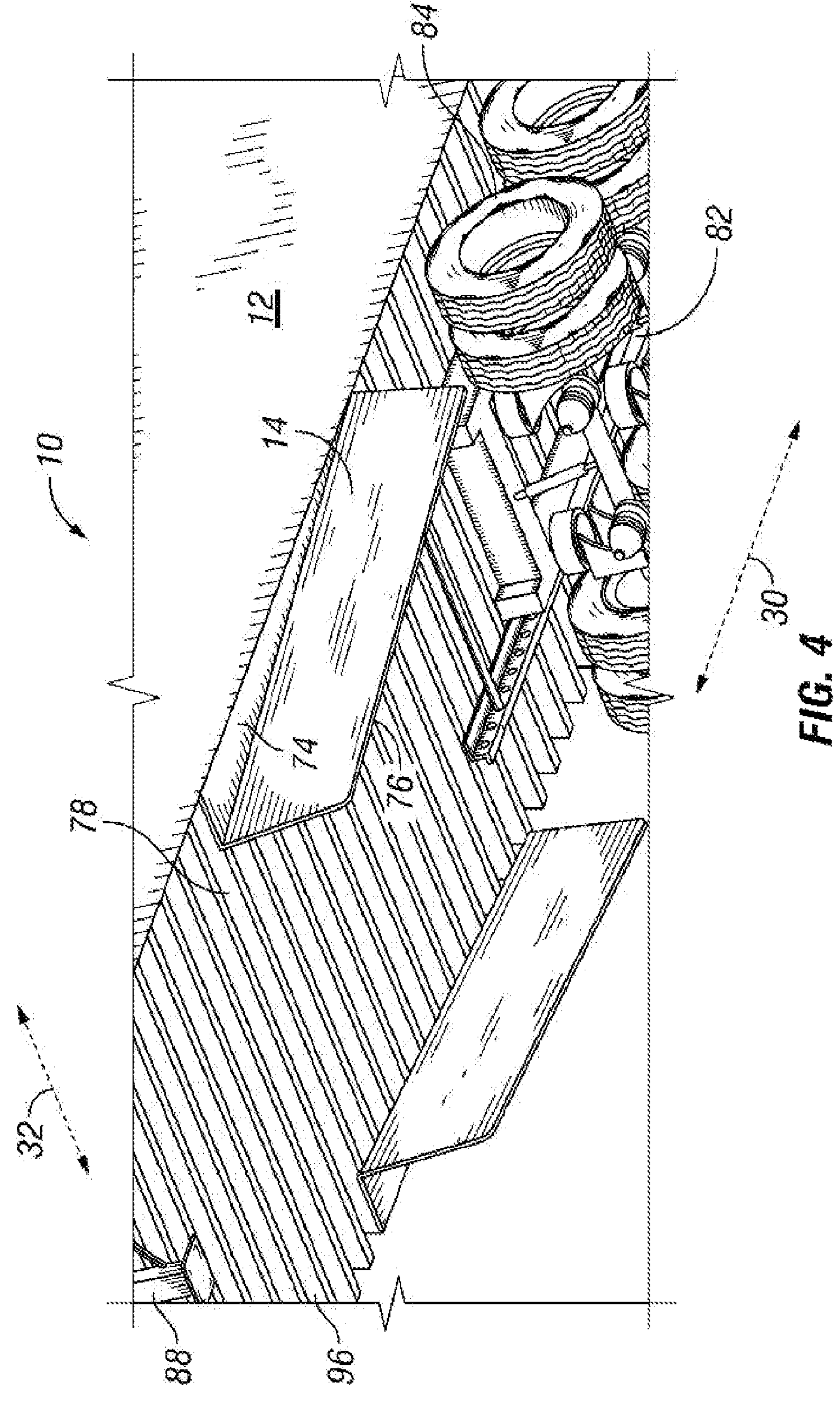
FIG. 4 is a bottom perspective view of an apparatus in accordance with another exemplary embodiment.

FIG. 4 shows a perspective view of a portion of the trailer 12 from its underside. The rib cover 74 extends to the forward end of the trailer skirt 14 and does not extend forward of the trailer skirt 14 in the longitudinal direction 30. Although shown as being completely outboard of the trailer skirt 14, the rib cover 74 could extend inboard from the trailer skirt 14 in the lateral direction 32 as well in other embodiments. The cross-members 96 between the two trailer skirts 14 and at the same longitudinal distances are not covered by the rib covers 74.

Figure 5:
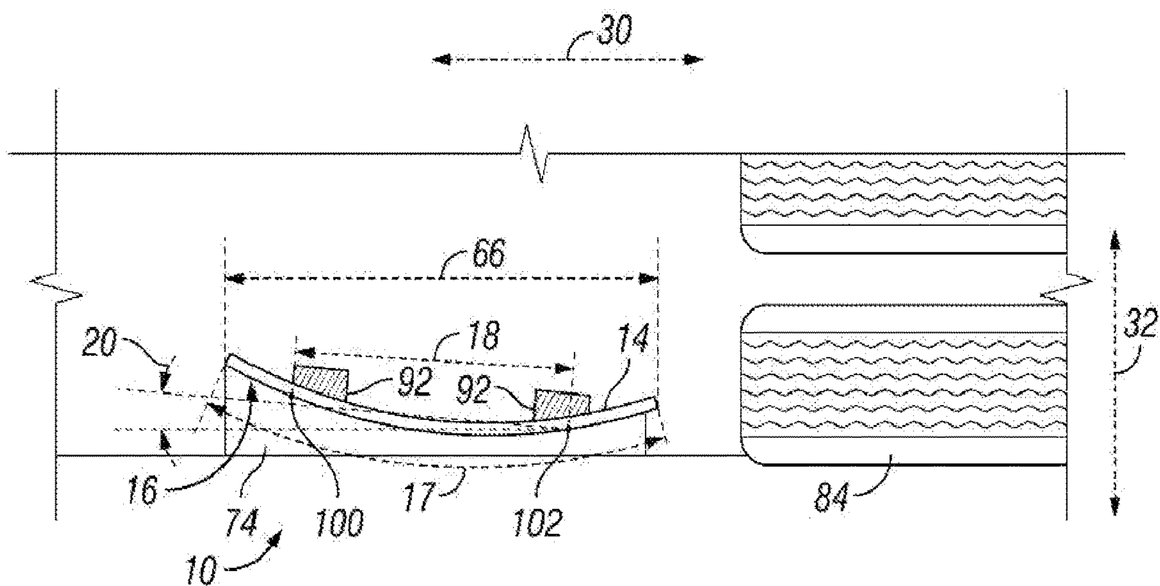
FIG. 5 is top view of a portion of a tractor trailer taken from just under a lower surface of the trailer in accordance with another exemplary embodiment.

As described, the outer surface 16 can be flat so that the outer surface majority length 18 is the same as the outer surface length 17. FIG. 5 shows an alternate embodiment of the trailer skirt 14 in which the outer surface 16 is not flat but has a curved shape that is convex. The outer surface length 17 can be measured by extending a measuring device along the outer surface 16 from the rear longitudinal end of the trailer skirt 14 to the front longitudinal end. A majority of this outer surface length 17 is oriented at an angle 20 that can be from 3 to 7 degrees to the longitudinal direction 30. In order to measure the outer surface length 18 when the outer surface length 17 is not from a fully planar outer surface 16, points 100 and 102 can be located along the outer surface length 17. The only qualification for the positioning of the points 100 and 102 is that the distance between them must cover a majority of the length of the outer surface length 17 rather than a minority of the length of the outer surface length 17. The points 100 and 102 can be placed anywhere on the outer surface so long as they respect the majority length restriction. A straight line is drawn from point 100 to point 102, and this line and distance are designated as the outer surface majority length 18. The angle 20 is measured from a line extending only completely in the longitudinal direction 30 to the outer surface majority length 18, and this angle 20 can be from 3-7, from 5-6 or 5.5 degrees in various exemplary embodiments. It is to be understood that the line drawn from point 100 to point 102 need not fall along the outer surface 16 but could be inboard or even outboard of the outer surface 16 in various configurations. If the points 100, 102 are moved to different locations, the angles measured relative to the longitudinal direction 30 may be outside of the largest 3-7 range. In this regard, a minority of the outer surface length 17 can be at an angle that is greater than 7 degrees, or less than 3 degrees. Still further, if the points are located at the extreme rearward and forward positions of the trailer skirt 14 in the longitudinal direction, the angle may be greater than 7 degrees, or less than 3 degrees. Although the entire outer surface length 17 may be outside of the 3-7 degree range, a majority of the outer surface length 18 which may be of a lesser length than the entire outer surface length 17 can still be within the 3-7 degree range of its angle 20 and hence fall within the parameters of the present apparatus 10.

The trailer skirt 14 is attached to the trailer 12 via one or more brackets 92 which can be attached to the lower surface 78 of the trailer 12 and extend downward therefrom in the height direction 34. Although two brackets 92 are shown, any number may be used to support the trailer skirt 14 in accordance with other exemplary embodiments. The brackets 92 can be rigid brackets or may be able to flex to some degree so that if the trailer skirt 14 is impacted the brackets 92 and trailer skirt 14 can flex to absorb this impact. In some embodiments, the brackets 92 could instead be bi-modulus bending members that support the trailer skirt 14 upon impact in the lateral direction 30 and function to push the deflected trailer skirt 14 back into its normal, aerodynamically beneficial position. If bi-modulus bending members are used, supporting brackets to hold the trailer skirt 14 onto the trailer 12 can be provided as well. The brackets 92 are on the side of the trailer skirt 14 opposite to the outer surface 16.

Figure 6:
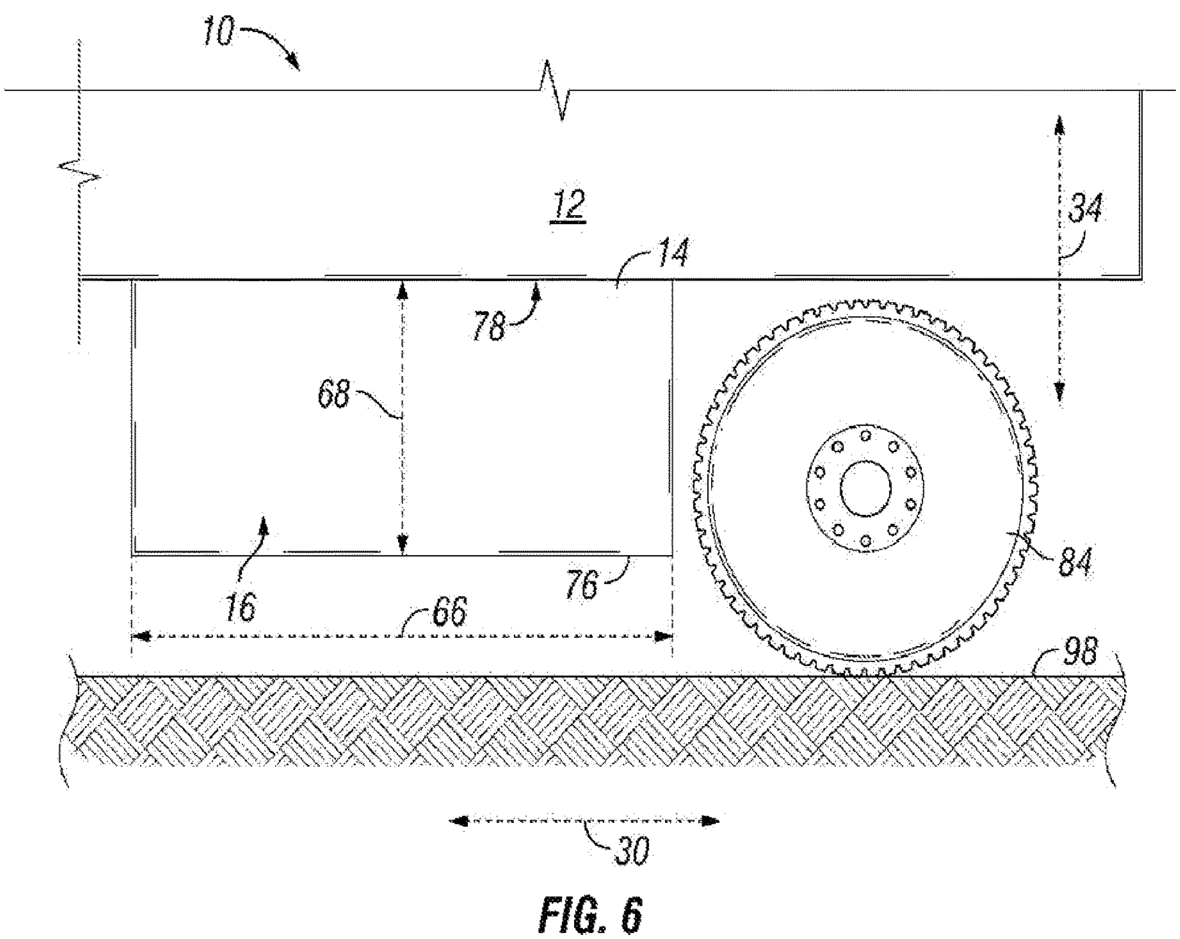
FIG. 6 is a side view of a portion of the tractor trailer having the apparatus in accordance with another exemplary embodiment.

FIG. 6 shows another embodiment of the apparatus 10 and in particular the trailer skirt 14. The apparatus 10 can be additionally constrained in that in order to optimize the cost to fuel benefit ratio, an overall longitudinal length 66 to overall height 68 ratio of the trailer skirt 14 is established as being 6 or less. In other embodiments, the overall longitudinal length 66/overall height 68 ratio is 5 or less. The trailer skirt 14 has a bottom edge 76 that is the lowest point of the trailer skirt 14 in the height direction 34. The bottom edge 76 is positioned so as to be above the ground 98 in the height direction 34 so that the bottom edge 76 does not touch the ground 98. The trailer skirt 14 is attached to the lower surface 78 of the trailer 12 and extends from this attachment point down to the bottom edge 76. The overall height 68 of the trailer skirt 14 is the distance measured from the lower surface 78 to the bottom edge 76 in the height direction 34. The overall longitudinal length 66 of the trailer skirt 14 is the distance in the longitudinal direction 30 from the rear end of the trailer skirt 14 to its forward end. As previously explained, the trailer skirt 14 is angled so its overall outer surface length 17 will be longer than its component of extension only in the longitudinal direction 30. However, since the angle 20 is small (3-7 degrees) this discrepancy in distances can be ignored for purposes of calculation of the overall longitudinal length 66. The overall longitudinal length 66 may be the longitudinal distance of the trailer skirt 14 when looking at the trailer skirt 14 from the side without regard to any extension inboard in the lateral direction 32. The overall length 66/overall height 68 is 6 or less, or in other embodiments is 5 or less.

The apparatus 10 achieves optimized aerodynamic performance for longer trailers 12 as compared to shorter trailers 12, and thus the apparatus 10 is provided for use on these longer trailers 12. The difference between a longer trailer 12 and shorter trailer 12 can be found in measurement of the trailer length 70. The apparatus 10 is provided for use on trailers 12 having a trailer length 70 that is 35 feet or greater. In some embodiments, the trailer length 70 is 48 feet or greater. In other embodiments, the trailer 12 is a full sized trailer 12 which has a trailer length 70 of 53 feet. The trailer length 70 is thus of a larger, as opposed to a smaller, sized trailer 12. In some embodiments, the trailer skirt 14 can have an overall length 66 in the longitudinal direction 30 that is 25% or less than the trailer length 70. In other embodiments, the overall length 66 is 20% or less than the trailer length 70.

Figure 7:
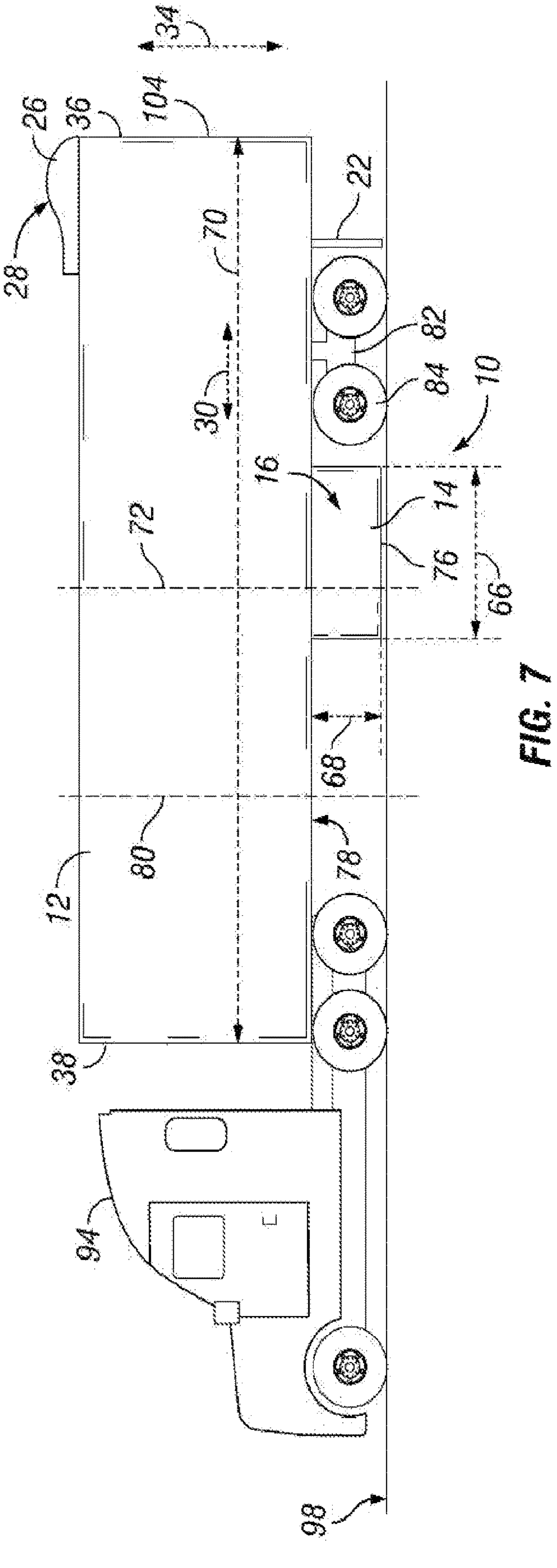
FIG. 7 is a side view of a tractor trailer that has an apparatus that includes a top fairing and an aerodynamic mud flap in accordance with another exemplary embodiment.

FIG. 7 is a side view of an apparatus 10 in accordance with an alternate exemplary embodiment in which the trailer skirt 14 and the rib cover 74 are again configured for placement onto a trailer 12 as previously discussed. In addition, the apparatus 10 includes an aerodynamic mud flap 22 located rearward of the tires 84 of the bogie assembly 82 in the longitudinal direction 30. The apparatus 10 also includes a top fairing 26 located on the top surface 28 of the trailer 12 proximate to the rearward terminal end 36. The presence of the aerodynamic mud flap 22 and the top fairing 26 compliment the aerodynamic performance of the trailer skirt 14 and rib cover 74 and achieve fuel savings better than or at least comparable to that of a long trailer skirt 14. The apparatus 10 may be provided with the trailer skirt 14, rib cover 74, top fairing 26, and aerodynamic mud flap 22 such that side fairings on the trailer 12 are not present, and such that rear skirts having at least a portion rearward of the bogie assembly 82 in the longitudinal direction 30 are not present. A wake disruptor 104 is shown extending from the rearward terminal end 36 and functions to increase aerodynamic performance of the trailer 12 during use. It is to be understood that a wake disruptor 104 is only optional and need not be present in other versions of the apparatus 10 that include only the small trailer skirt 14 and rib covers 74; or includes only the small trailer skirt 14, rib covers 74, aerodynamic mud flaps 22, and top fairing 26. There should not be any additional aerodynamic features carried by the trailer other than the elements 14, 74, 22, 26 in various exemplary embodiments because doing so would not maintain optimal savings per material costs. In some embodiments, no trailer skirt is present on the trailer 12 forward of the discussed small trailer skirt 14 in the longitudinal direction 30, this means there is no trailer skirt forward of the right hand small skirt 14 or forward of the left hand small skirt 14 in the longitudinal direction 30 such that only the left and right hand small skirts 14 are the only two skirts on the trailer. In other embodiments, skirts may be rearward of the right and left hand side small skirts 14 in the longitudinal direction 30.

Figure 8:
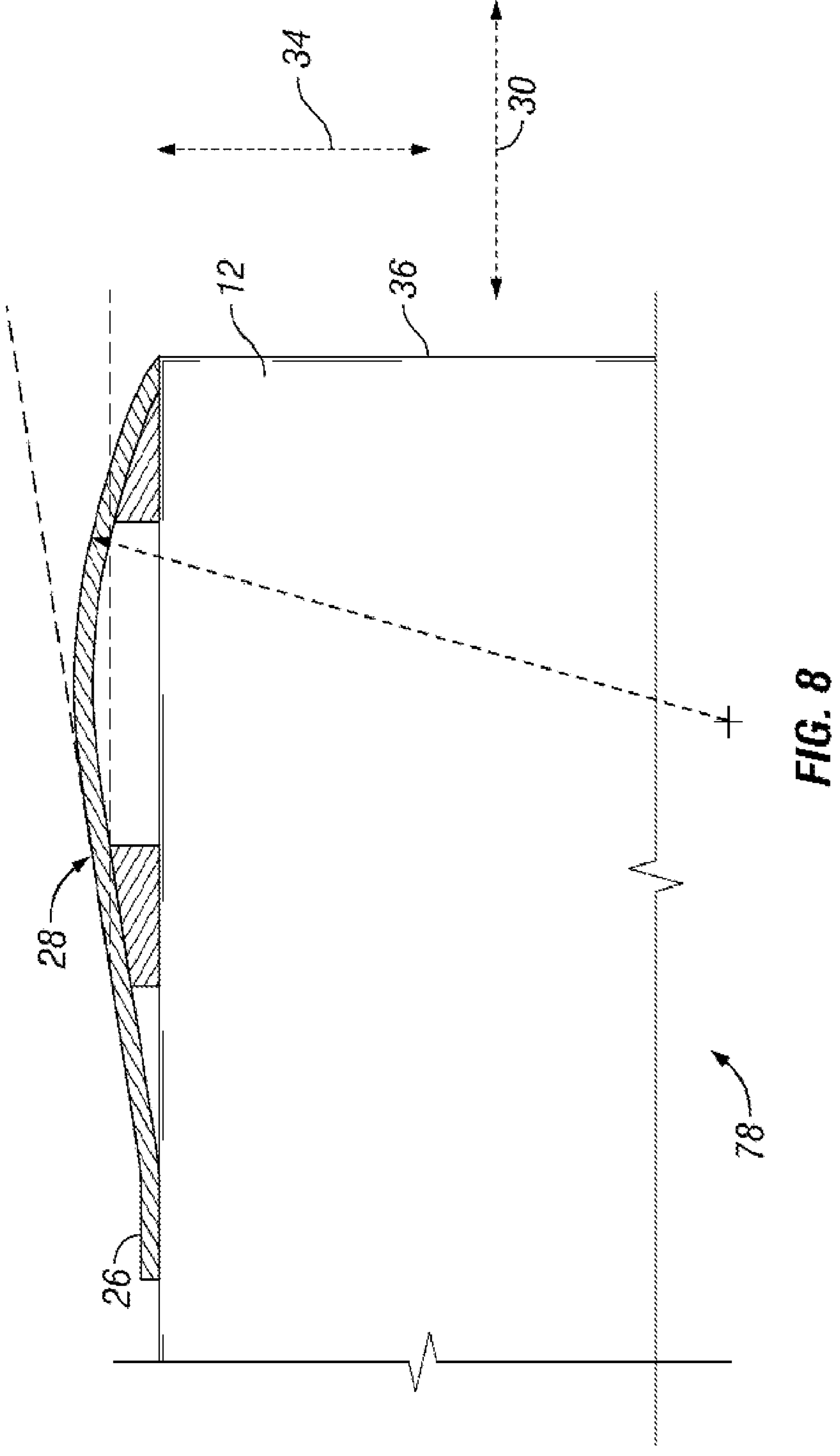
FIG. 8 is a side view of a top fairing located at the top surface of the trailer in accordance with one exemplary embodiment.

A sideview partially in cross-section of the top fairing 26 is shown in FIG. 8. The top fairing 26 engages a top surface 28 of the trailer 12 and is positioned near the rearward terminal end 36 in the longitudinal direction 30. The top fairing 26 has a top surface across which air flows during transport of the trailer 12 in a beneficial direction so as to achieve some aerodynamic benefits to reduce drag and fuel costs of the tractor trailer 94/12 system. The top surface 28 has a leading portion that is flat but oriented at an angle to the longitudinal direction 30. A tailing portion of the top surface 28 extends from the leading portion and terminates at a rearward terminal end of the top fairing 26. The tailing portion of the top surface 28 is convex in shape and has a radius of curvature that may in some instances have a center point that is lower than the lower surface 78 in the height direction 34. The tailing portion may be made of multiple radii of curvatures or flat sections in other embodiments. The tailing portion terminates at or just forward of the rearward terminal end 36 in the longitudinal direction 30 so that no part of the top fairing 26 extends rearward of the rearward terminal end 36 in the longitudinal direction 30. The top fairing 26 can extend across the entire lateral width of the top surface of the trailer 12 in the lateral direction 32 or may extend over a majority of the lateral width in various embodiments. The top fairing 26 can be arranged in the same manner as disclosed in patent application number PCT/US17/30297 filed on Apr. 29, 2017 and entitled End of Trailer Fairing for Improved Aerodynamic Performance, the contents of which are incorporated by reference herein in their entirety for all purposes.

The aerodynamic mud flap 22 is positioned behind the tires 84 to prevent mud, dirt, snow, and other debris from flying off of the tires 84 and striking vehicles traveling behind the trailer 12 or otherwise impinging upon their visibility. The aerodynamic mud flap 22 is said to be aerodynamic in that it includes apertures 90 that are positioned to allow air to flow through the aerodynamic mud flap 22 to reduce drag caused by the presence of this material behind the tires 84. There may be a single aerodynamic mud flap 22 behind one or more of the tires 84, or there can be multiple aerodynamic mud flaps 22 behind one or more of the tires 84 such that there is at least one aerodynamic mud flap 22 behind each one of the rear tires 84 of the bogie assembly. There may or may not be any aerodynamic mud flaps 22 immediately behind the forward tires 84, and hence immediately in front of the rearward tires 84, of the bogie assembly 82.

Figure 9:
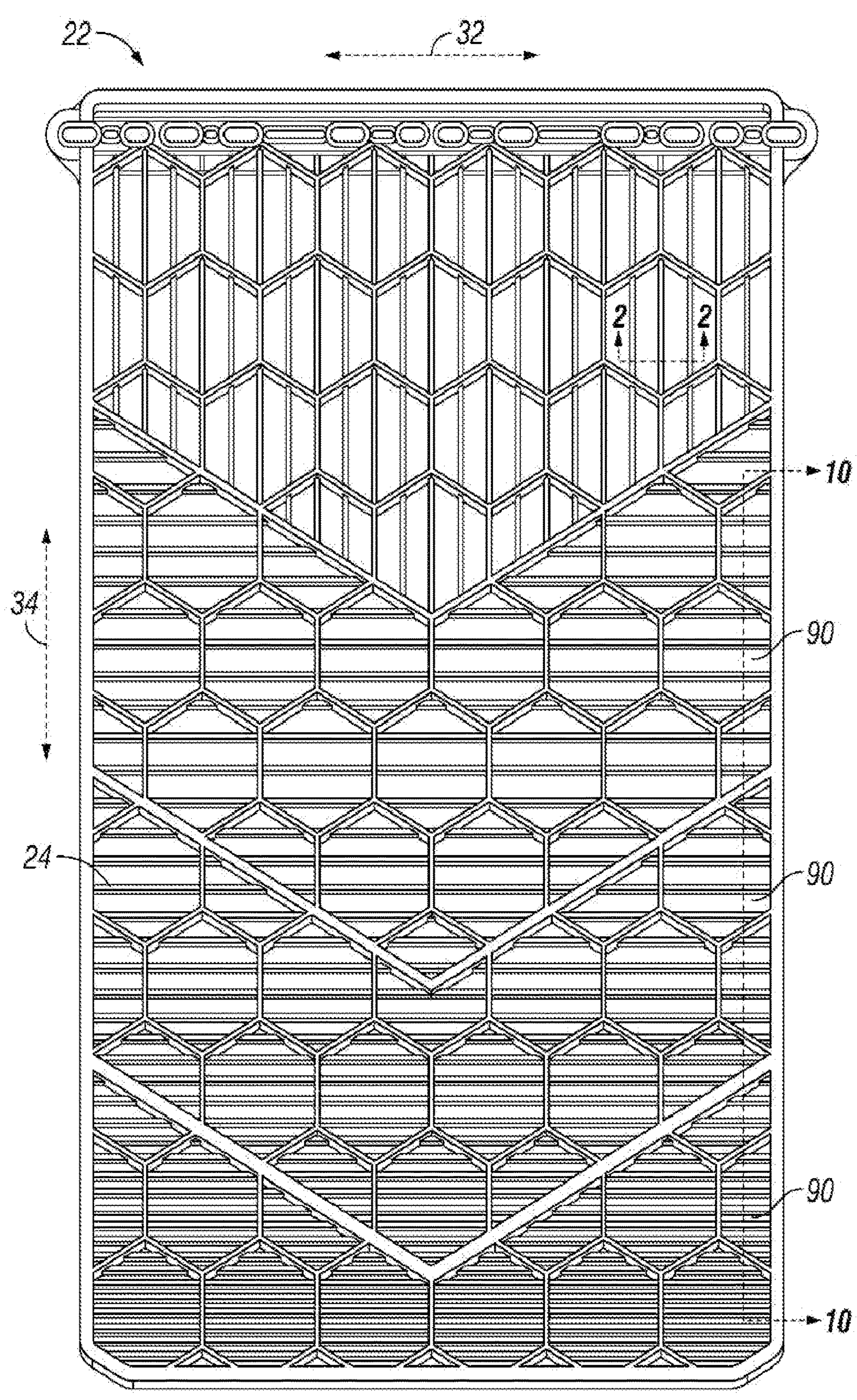
FIG. 9 is a front view of an aerodynamic mud flap in accordance with one exemplary embodiment.
Figure 10:
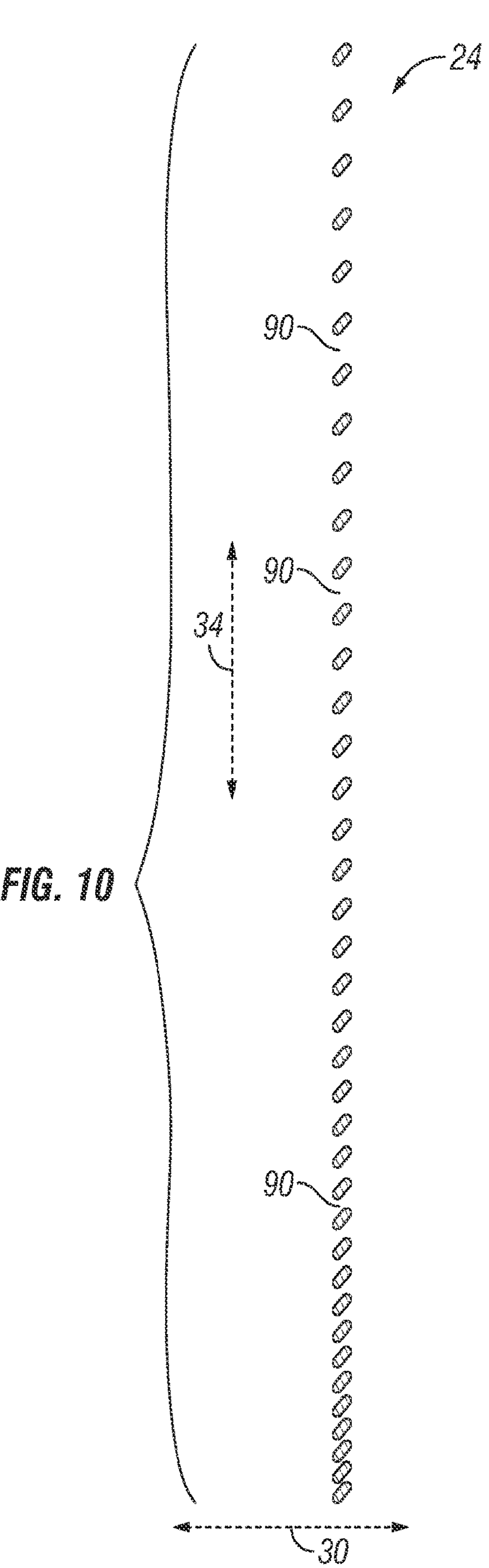
FIG. 10 is a cross-sectional view taken along line 10-10 of FIG. 9.

The aerodynamic mud flap 22 has a barrier section 24 that features horizontal louvers spaced from one another in the height direction 34 so as to form apertures 90 between successive horizontal louvers in the height direction 34. FIG. 10 is a cross-sectional view taken along line 10-10 of FIG. 9 that shows the spacing of the horizontal louvers and the formation of the apertures 90 therebetween. The spacing increases in the height direction 34 so that the apertures 90 are smaller in height at the bottom of the aerodynamic mud flap 22 and increase in size upon moving upwards in the height direction 34 to the top of the barrier section 24. The horizontal louvers have upper and lower surfaces that are angled relative to the longitudinal direction 30 and are arranged in such a way that debris exiting the tires 84 primarily engage the horizontal louvers instead of flowing through the apertures 90 and harassing trailing vehicles. The increasing aperture 90 size and the angles of the horizontal louvers are optimized for increasing air flow through the aerodynamic mud flap 22 while at the same time minimizing the flow of debris through the aerodynamic mud flap 22. The barrier section 24 that includes the apertures 90 can extend along the entire height of the aerodynamic mud flap 22 in the height direction 34. Alternatively, there can be other sections above or below the barrier section 24 in the height direction 34. In the embodiment shown in FIGS. 9 and 10 a secondary section is present above the barrier section 24 and features vertical louvers that extend in the height direction 34 and are spaced from one another in the lateral direction 32 to form vertically oriented apertures along the width of the aerodynamic mud flap 22. These vertical apertures may all be of the same size in the width direction. In other embodiments, the section above the barrier section 24 is completely solid and has no apertures. The aerodynamic mud flap 22 can be variously configured in accordance with different exemplary embodiments. The aerodynamic mud flap 22 can be arranged as shown in PCT/US2018/053761 filed Oct. 1, 2018 and published as WO 2019/068089, the contents of which are incorporated by reference herein in their entirety for all purposes.

The apparatus 10 provides a fast return on investment as the apparatus 10 minimizes material used per unit of fuel savings. The optimized trailer skirt 14 provides performance slightly better than an average trailer skirt but with reduced material. The short trailer skirt 14 provides better ground clearance, better weight per unit fuel saved, reduced number of parts, and compatibility of parts with other trailer configurations. The smaller angled trailer skirt 14 with the rib cover 74 achieves aerodynamic savings similar to a larger trailer skirt. The small size of the trailer skirt 14 along with the low height 68 to length 66 ratio allows for access under the trailer 12 while still providing fuel savings not available through other solutions. When large trailers 12, those having a trailer length 70 over 35 feet, are fitted with aerodynamic solutions, a large trailer skirt is utilized. A large trailer skirt measures 264 inches by 33.25 inches, and when compared to a present small trailer skirt 14 having an overall length 66 of 132 inches and a height 68 of 27 inches (4.9 length/height ratio) the larger trailer skirt is 247% larger in area. The smaller trailer skirt 14 has an angle 20 that measures 5.5 degrees, and rib covers 74 were utilized. The smaller trailer skirt 14 was located completely forward of the bogie assembly 82 and tire 84, and the majority of the outer surface length 18 was rearward of the longitudinal midpoint 72. However, the utilization of the smaller trailer skirt 14 surprisingly saved more fuel. The apparatus 10 with the smaller trailer skirt 14, rib cover 74, top fairing 26, and aerodynamic mud flaps 22 saved 6.7% more fuel than just an aerodynamic system fitted with only the aforementioned large trailer skirt. The aforementioned apparatus 10 with the small trailer skirts 14, rib covers 74, aerodynamic mud flaps 22 and top fairing 26 was also compared to an aerodynamic system that features a large trailer skirt, side and top rear fairings, aerodynamic mud flaps, and a wake reducer. The aforementioned apparatus 10 resulted in 65% of the fuel savings that are achieved with the aerodynamic system that features the large trailer skirt, side and top rear fairings, aerodynamic mud flaps, and wake reducer. However, the aerodynamic system 10 with the small trailer skirts 14, rib covers 74, aerodynamic mud flaps 22 and top fairing 26 achieved 65% of the fuel savings with 35% less material and weight of the system that included the long trailer skirts, side and top rear fairings, aerodynamic mud flaps and wake reducer. The present apparatus 10 is used on trailers 12 having long trailer lengths 70 and not on those trailers 12 having trailer lengths 70 less than 35 feet.

In order to save additional fuel, the size of the trailer skirt 14 can be increased. The optimum efficiency of the length/height ratio should be respected and should not be greater than 6 and should be ideally 5. As such, for every inch of added height 68, 5 to 6 inches of overall length 66 should be added. For a 30 inch tall trailer skirt 14, the overall length 66 should be from 150 to 180 inches. Height 68 may be added until the length 66 is between 30 inches and 32 inches. As this process is conducted, the amount of fuel saved per area of the trailer skirt 14 is reduced, but the overall fuel savings is increased.

In accordance with one experiment conducted, the trailer 12 with the apparatus 10 having the small skirt 14 at the aforementioned positioning, length 66/height 68 ratio, and angle 20, along with the rib covers 74, aerodynamic mud flaps 22, and top fairing 26 was evaluated and resulted in a 7.27 gallon/1000 miles savings versus a trailer 12 without said apparatus 10. This apparatus 10 was compared to a trailer 12 equipped with a large trailer skirt only that measured 264 inches by 33.25 inches which resulted in a fuel savings of 6.81 gallon/1000 miles.

While the present subject matter has been described in detail with respect to specific embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be apparent.

What is claimed is:

1. An apparatus for a trailer that has a longitudinal direction, a lateral direction, and a height direction, comprising:

- a trailer skirt configured for attachment to the trailer, wherein the trailer skirt has an outer surface that has an outer surface length, wherein a majority of the outer surface length is oriented at an angle from 3 degrees to 7 degrees to the longitudinal direction such that the majority of the outer surface length extends inboard in the lateral direction upon extension forward in the longitudinal direction;
- wherein the trailer skirt has an overall length in the longitudinal direction and an overall height in the height direction that has an overall length/overall height ratio that is 6 or less;
- wherein the trailer has a trailer length in the longitudinal direction that is at least 35 feet, wherein the trailer has a longitudinal midpoint that is located in the longitudinal direction, and wherein a majority of the outer surface length is located rearward of the longitudinal midpoint in the longitudinal direction;

a rib cover that is carried by the trailer, wherein the rib cover is located higher than a bottom edge of the trailer skirt in the height direction, wherein the rib cover is wedge shaped and located outboard from the trailer skirt in the lateral direction;

wherein the trailer has a plurality of cross-members that extend in the lateral direction and are spaced from one another in the longitudinal direction, wherein the rib cover covers increasingly larger portions of successive cross-members upon extension of the rib cover forward in the longitudinal direction.

2. The apparatus as set forth in claim 1, wherein the angle that the majority of the outer surface length is oriented to the longitudinal direction is from 5 degrees to 6 degrees.

3. The apparatus as set forth in claim 1, wherein the trailer has a forward terminal end and a rearward terminal end and the trailer length extends in the longitudinal direction from the forward terminal end to the rearward terminal end, wherein a 30% point of the trailer is at a location that is distanced 30% of the trailer length from the forward terminal end in the longitudinal direction;

wherein no portion of the trailer skirt is located forward of the 30% point in the longitudinal direction.

4. The apparatus as set forth in claim 1, wherein the trailer length is at least 48 feet.

5. The apparatus as set forth in claim 4, wherein the trailer length is 53 feet.

6. The apparatus as set forth in claim 1, wherein the rib cover is configured to engage a lower surface of the trailer.

7. The apparatus as set forth in claim 1, wherein the entire outer surface of the trailer skirt is flat, and wherein the entire outer surface of the trailer skirt is oriented at the angle from 3 degrees to 7 degrees to the longitudinal direction.

8. The apparatus as set forth in claim 1, wherein the overall length/overall height ratio of the trailer skirt is 5 or less.

9. The apparatus as set forth in claim 1, wherein the trailer has a bogie assembly that has a plurality of tires, and wherein the entire trailer skirt is configured for being located forward of all of the plurality of tires of the bogie assembly in the longitudinal direction, and wherein the entire rib cover is configured for being located forward of all of the plurality of tires of the bogie assembly in the longitudinal direction.

10. The apparatus as set forth in claim 9, wherein the trailer has landing gear, and wherein the entire trailer skirt is configured for being located rearward of the landing gear in the longitudinal direction, and wherein the entire rib cover is configured for being located rearward of the landing gear in the longitudinal direction.

11. The apparatus as set forth in claim 1, further comprising an aerodynamic mud flap configured to be carried by the trailer, wherein the aerodynamic mud flap is located rearward of the trailer skirt in the longitudinal direction, wherein the aerodynamic mud flap has a barrier section that includes apertures therethrough that allow air and particles to flow through the barrier section during travel of the trailer.

12. The apparatus as set forth in claim 1, further comprising a top fairing configured for being mounted to a top surface of the trailer, wherein the top fairing is configured to be located closer to the rearward terminal end of the trailer than to the forward terminal end of the trailer in the longitudinal direction.

13. The apparatus as set forth in claim 12, wherein the top fairing does not extend rearward of the rearward terminal end of the trailer in the longitudinal direction; and wherein the top fairing, the trailer skirt, and the rib cover do not have any moving parts during use of the trailer.

14. The apparatus as set forth in claim 1, wherein the overall length of the trailer skirt is 25% or less of the trailer length.

15. The apparatus as set forth in claim 1, wherein there are no further skirts configured for attachment to the trailer forward of the trailer skirt in the longitudinal direction that are on the same side of the trailer as the trailer skirt.

16. An apparatus for attachment to a trailer having a plurality of cross-members, comprising:

a trailer skirt having an outer surface that faces away from a center of the trailer when the trailer skirt is attached to the trailer; and a rib cover extending from the outer surface of the trailer skirt, the rib cover is located higher than a bottom edge of the trailer skirt in a height direction and is shaped to cover increasingly larger portions of successive cross-members of the trailer when the trailer skirt is attached to the trailer.

17. The apparatus as set forth in claim 16, wherein the rib cover is shaped such that the rib cover is flush with a side of the trailer when the trailer skirt is attached to the trailer at an angle relative to a longitudinal direction of the trailer.

18. The apparatus as set forth in claim 16, wherein the rib cover is wedge shaped.

* * * * *